(12) United States Patent
Marr et al.

(10) Patent No.: US 10,819,377 B1
(45) Date of Patent: Oct. 27, 2020

(54) RADIO FREQUENCY TO OPTICAL TRANSMITTER

(71) Applicant: RAYTHEON COMPANY, Waltham, MA (US)

(72) Inventors: Harry B. Marr, Manhattan Beach, CA (US); Daniel Thompson, Hermosa Beach, CA (US); Aleksandr S. Radunsky, Lawndale, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/403,442

(22) Filed: May 3, 2019

(51) Int. Cl.
*H04B 1/04* (2006.01)
*H04B 10/516* (2013.01)
*H04B 1/03* (2006.01)

(52) U.S. Cl.
CPC ............. *H04B 1/04* (2013.01); *H04B 1/03* (2013.01); *H04B 10/516* (2013.01)

(58) Field of Classification Search
CPC .......... H04B 10/2575; H04B 10/25759; H04B 10/07955; H04B 10/2507; H04B 10/25751; H04B 10/2589; H04B 10/27; H04B 10/272; H04B 10/29; H04B 10/50; H04B 10/516; H04B 10/564; H04B 10/807; H04J 14/0221; H04J 14/02
USPC .................................................. 398/182–201
See application file for complete search history.

(56) References Cited

U.S. PATENT DOCUMENTS

| | | | |
|---|---|---|---|
| 7,269,354 B1* | 9/2007 | Silverman .......... | H04B 10/2575 398/115 |
| 8,373,921 B2 | 2/2013 | Ridgway | |
| 9,413,471 B2* | 8/2016 | Karras .................... | H04B 10/90 |
| 10,009,138 B2* | 6/2018 | Cavaliere ......... | H04B 10/25759 |
| 2004/0131366 A1 | 7/2004 | Tsushima | |
| 2005/0069333 A1* | 3/2005 | Moeller ................. | H04B 10/64 398/202 |
| 2005/0175358 A1* | 8/2005 | Ilchenko ................ | H04B 10/60 398/198 |

(Continued)

FOREIGN PATENT DOCUMENTS

JP            2007 201540 A       8/2007

OTHER PUBLICATIONS

Pan et al; Photonics based broadband microwave measurement; Journal of light wave technology Aug. 2017; pp. 3498-3513. (Year: 2017).*

(Continued)

*Primary Examiner* — Amritbir K Sandhu
(74) *Attorney, Agent, or Firm* — Lewis Roca Rothgerber Christie LLP (57) ABSTRACT

A transmitter. In some embodiments, the transmitter has an electrical input and an optical output. The transmitter may include a light source; an optical amplitude modulator having an optical input connected to the light source, a modulation input connected to the electrical input, and an output; and a first gated optical comparator, having a sampling clock input, an analog input connected to the output of the optical amplitude modulator, and an output. The first gated optical comparator may be configured to generate, for each cycle of an optical sampling clock signal received at the sampling clock input, a one-bit digital representation of an analog optical signal received at the analog input.

20 Claims, 5 Drawing Sheets

(56) References Cited

U.S. PATENT DOCUMENTS

| | | | | |
|---|---|---|---|---|
| 2008/0038001 A1* | 2/2008 | Becker | .............. | H04B 10/616 398/204 |
| 2013/0315590 A1* | 11/2013 | Zhou | .............. | H01Q 3/2676 398/48 |
| 2015/0304064 A1* | 10/2015 | Mutalik | .............. | H04B 10/807 398/48 |
| 2018/0248630 A1 | 8/2018 | Heimbuch | | |
| 2020/0076464 A1* | 3/2020 | Marr | .............. | H03M 7/3048 |

OTHER PUBLICATIONS

Pan et al; photonics based broadband Microwave measurement; IEEE, Journal of Light wave technology vol. 35, No. 16, Aug. 15, 2017; pp. 3498-3513. (Year: 2017).*

Foreign reference JP-2007-201540 English translation, 2007 (Year: 2007).*

Li, Ze et al., "A Reconfigurable Microwave Photonic Channelized Receiver Based on Dense Wavelength Division Multiplexing Using an Optical Comb", Optics Communications, Jan. 30, 2012, pp. 2311-2315, Elsevier B.V.

Rasras, Mahmoud S., "Reconfigurable Linear Optical FM Discriminator", IEEE Photonics Technology Letters, Oct. 15, 2012, pp. 1856-1859, vol. 24, No. 20, IEEE.

Ridgway, Richard W. et al., "Microwave Photonics Programs at DARPA", Journal of Lightwave Technology, Oct. 15, 2014, pp. 3428-3439, vol. 32, No. 20.

Saharia, Ankur et al., "An approach for Realization of all optical NAND gate using Nonlinear Effect in SOA", NNGT Int. J. on Signal Processing and Imaging Engineering, Jul. 2014, pp. 1-5, vol. 1, N&N Global Technology.

Stead, Michael et al., "Demonstration of an RF-Photonic Microwave Channelizer Using an Optical Fiber Recirculating Loop", Army Research Laboratory, Dec. 2008, 6 pages.

Wang, Wenshen et al., "Characterization of a Coherent Optical RF Channelizer Based on a Diffraction Grating", IEEE Transactions on Microwave Theory and Techniques, Oct. 2001, pp. 1996-2001, vol. 49, No. 10.

Wyrwas, John M. et al., "High Dynamic Range Linearized FM Photonic Link", 2012 IEEE Photonics Society Summer Topical Meeting Series, 2012, pp. 153-154, IEEE.

Zou, Xihua et al, "Photonic-Assisted Microwave Channelizer With Improved Channel Characteristics Based on Spectrum-Controlled Stimulated Brillouin Scattering", IEEE Transactions on Microwave Theory and Techniques, Sep. 2013, pp. 3470-3478, vol. 61, No. 9, IEEE.

Saharia et al., "An Approach for Realization of All Optical NAND Gate Using Nonlinear Effect in SOA", NNGT Int. J. On Signal Processing and Imaging Engineering, vol. 1, Jul. 30, 2014 (5 pages).

Wang et al., "Characterization of a Coherent Optical RF Channelizer Based on a Diffraction Grating", IEEE Transactions on Microwave Theory and Techniques, Plenum, USA, vol. 49, No. 10 Oct. 2001 (pp. 1996-2001).

Invitation to Pay Additional Fees and, Where Applicable, Protest Fee for corresponding International Application No. PCT/US2020/020499, Invitation to Pay Additional Fees dated Jul. 13, 2020 (13 pages).

* cited by examiner

RADIO FREQUENCY TO OPTICAL TRANSMITTER

FIELD

One or more aspects of embodiments according to the present invention relate to signal transmission, and more particularly to a transmitter for transmitting, in digital optical form, signals received in electrical form by the transmitter.

BACKGROUND

In various commercial systems (e.g., mobile communications systems) and in military systems such as radars, there may be a need to transport radio frequency signals over some distance, e.g., a few meters, from an antenna to a processing system, or from a processing system to an antenna. Transmitting such signals using coaxial cables may be costly and may result in high system mass, as a result of the high mass of a coaxial cable relative to the bandwidth such a cable is capable of transmitting. Moreover, at high frequencies the loss in coaxial cables may be unacceptable except at very short lengths.

Thus, there is a need for an improved system for transmitting data.

SUMMARY

In some embodiments of the present disclosure, there is provided a transmitter, having an electrical input and an optical output, the transmitter including: a light source; an optical amplitude modulator configured to receive an optical input from the light source and a modulation input from the electrical input; and a first gated optical comparator configured to receive an optical sampling clock signal and an output from the optical amplitude modulator, the first gated optical comparator being further configured to generate as the optical output, for each cycle of the optical sampling clock signal, a one-bit digital representation of an analog optical signal received from the optical amplitude modulator.

In some embodiments, the light source is a semiconductor laser.

In some embodiments, the first gated optical comparator is configured to produce: an output signal determined by whether an optical power level at an analog input of the first gated optical comparator is above a first threshold, when a sampling clock input is in an enabled state, and a fixed output when the sampling clock input is in a disabled state.

In some embodiments, the sampling clock input is in an enabled state when an optical signal received at the sampling clock input has a power level exceeding a second threshold.

In some embodiments, the output signal has an optical power greater than a first power value when the analog input of the first gated optical comparator is above the first threshold, and the output signal has an optical power less than a second power value when the analog input of the first gated optical comparator is not above the first threshold, the second power value being less than the first power value.

In some embodiments, the output signal has an optical power greater than a first power value when the analog input of the first gated optical comparator is not above the first threshold, and the output signal has an optical power less than a second power value when the analog input of the first gated optical comparator is above the first threshold, the second power value being less than the first power value.

In some embodiments, the first gated optical comparator is an optical NAND gate.

In some embodiments, the optical NAND gate includes a continuous wave light source for emitting light at a first wavelength, a semiconductor optical amplifier, and a band pass filter.

In some embodiments: the band pass filter is configured to pass light at the first wavelength; and the semiconductor optical amplifier is configured to: receive light from: the continuous wave light source of the optical NAND gate, a sampling clock input of the first gated optical comparator, an analog input of the first gated optical comparator, and transmit the light from the continuous wave light source when either light from the sampling clock input of the first gated optical comparator, or light from the analog input of the first gated optical comparator is not present, and attenuate, as a result of four-wave mixing in the semiconductor optical amplifier, the light from the continuous wave light source when both light from the sampling clock input of the first gated optical comparator, and light from the analog input of the first gated optical comparator are present.

In some embodiments, the optical NAND gate includes a nonlinear optical crystal and a band pass filter.

In some embodiments, the nonlinear optical crystal is a periodically poled lithium niobate crystal.

In some embodiments, the transmitter further includes a first optical amplifier, wherein the analog input of the first gated optical comparator is connected to the output of the optical amplitude modulator through the first optical amplifier.

In some embodiments, the light source is a laser with an operating wavelength between 1540 nm and 1560 nm, and the first optical amplifier is an erbium doped fiber amplifier.

In some embodiments, the transmitter further includes a second optical amplifier, wherein the optical input of the optical amplitude modulator is connected to the light source through the second optical amplifier.

In some embodiments, the transmitter further includes an optical noise source, wherein the analog input of the first gated optical comparator is connected to the output of the optical amplitude modulator through the optical noise source.

In some embodiments, the optical noise source includes an electrical noise source and an optical amplitude modulator, a modulation input of the optical amplitude modulator of the optical noise source being connected to an output of the electrical noise source.

In some embodiments, the optical amplitude modulator is a Mach-Zehnder modulator.

In some embodiments, the optical amplitude modulator is an electro-absorption modulator.

In some embodiments, the transmitter further includes: an optical power splitter, connected between the light source and the optical amplitude modulator; an optical channelizer, having: a signal input, a local oscillator input, and a plurality of outputs including a first output and a second output; and a second gated optical comparator, having: a sampling clock input, and an analog input, the first output of the optical channelizer being connected to the analog input of the first gated optical comparator, and the second output of the optical channelizer being connected to the analog input of the second gated optical comparator.

In some embodiments, the transmitter further includes an optical multiplexer having: a first input, a second input, and an output, the first input being connected to the output of the first gated optical comparator, and the second input being connected to the output of the second gated optical comparator.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a radio frequency (RF) to optical transmitter provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the scope of the invention. As denoted elsewhere herein, like element numbers are intended to indicate like elements or features.

In various commercial systems (e.g., mobile communications systems) and in military systems such as radars, there may be a need to transport RF signals over some distance, e.g., a few meters, from an antenna to a processing system, or from a processing system to an antenna. For high frequencies or bandwidths, transmitting the signals in electrical form may result in unacceptable loss (e.g., loss in coaxial cables) and it may therefore be advantageous to convert the signals to optical form (e.g., to amplitude modulated light, at 1310 nm or at 1550 nm) to transmit them over one or more optical fibers (e.g., single mode fibers). Related art systems for performing such a conversion from RF signals to optical signals may include one or more analog to digital converters for converting the RF signals to a plurality of digital data streams, and one or more modulators for modulating light (e.g., light from a continuous wave source, such as an unmodulated semiconductor laser) with the digital data produced by the analog to digital converters. For example, related art radar systems may digitize RF signals from an antenna using one or more analog to digital converters, digitally preprocess the data (e.g., beamforming, equalization, etc.), then transfer the data to another downstream digital processor (e.g., modes). To keep up with the rising data throughputs (i.e., up to many gigabits per second), some such systems may use optical interconnect technologies such as 40 and 100 gigabit Ethernet standards to interface to the back end. Such systems may have significant mass (which may be disadvantageous, for example, in an aircraft) and may have high power consumption, e.g., they may consume about 20 W to convert a radio frequency signal with a bandwidth of 20 GHz to an optical signal.

Figure 1:
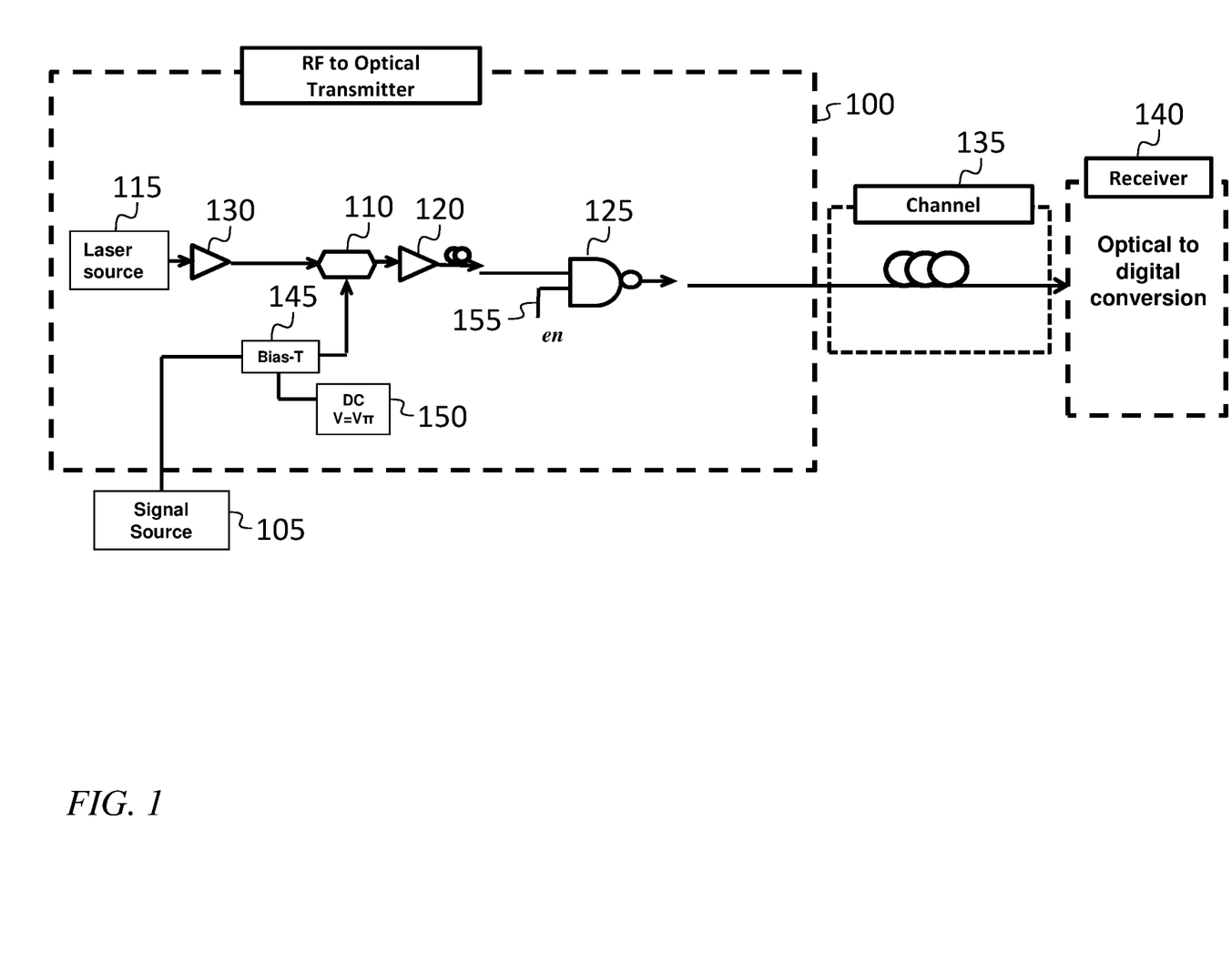
FIG. 1 is a block diagram of a system for signal transmission, according to an embodiment of the present invention.

In some embodiments, considerable power savings are possible by performing monobit analog to digital conversion in the optical domain. Referring to FIG. 1, in some embodiments, a RF to optical transmitter 100 is configured to receive, at an electrical input, a radio frequency signal from a signal source 105 (e.g., from an antenna). The RF to optical transmitter 100 includes an optical amplitude modulator 110 having an optical input connected to a continuous wave light source 115, and a modulation input connected to the electrical input (which is connected to the signal source 105). The light source 115 may be an unmodulated semiconductor laser emitting light at 1550 nm.

The optical amplitude modulator 110 modulates (e.g., applies amplitude modulation to) the light it receives from the light source 115. The modulation it applies corresponds to the signal received, at a modulation input of the optical amplitude modulator 110, from the signal source 105. The output of the optical amplitude modulator 110 transmits the modulated light, through a first optical amplifier 120 (which may be an erbium-doped fiber amplifier (EDFA)), to a gated optical comparator 125. A second optical amplifier 130 (which may be an erbium-doped fiber amplifier (EDFA)) may amplify the output of the light source 115. The optical amplitude modulator 110 may be any suitable optical amplitude modulator, such as a Mach-Zehnder modulator or an electro-absorption modulator. A bias tee 145 may be used to apply a bias (e.g., from a DC bias source 150) to the optical amplitude modulator 110; in the case of a Mach-Zehnder modulator this bias may be selected so that the DC operating point is one at which the optical signals combined by the power combiner of the Mach-Zehnder modulator are 90 degrees out of phase, and the output power is one half of the maximum output power. The amplitude of the modulating signal at the modulation input of the optical amplitude modulator 110 may be selected (e.g., by amplifying or attenuating the signal produced by the signal source 105) such that the optical amplitude modulator 110 produces substantially linear amplitude modulation of the light from the light source 115, thereby generating an optical signal carrying an analog representation of the signal produced by the signal source 105.

The gated optical comparator 125 may, as suggested by the symbol used to represent it in FIG. 1, be an optical NAND gate. The output of the gated optical comparator 125 (which, in the embodiment of FIG. 1, is the output of the radio frequency to optical transmitter 100) is transmitted through a channel 135 (e.g., a single-mode optical fiber), to a receiver 140, which converts the optical signal received from the radio frequency to optical transmitter 100 to a digital electrical signal corresponding to the signal from the signal source 105.

The gated optical comparator 125 has (i) an analog input connected to the output of the optical amplifier 120 and (ii) a sampling clock input 155. In operation, the gated optical comparator 125 receives an optical sampling clock signal at the sampling clock input 155, and acts as a monobit (i.e., one-bit) optical analog to digital converter (or "digitizer"), converting, once per cycle of the optical sampling clock signal, an analog signal received at the analog input of the gated optical comparator 125 to a digital optical signal at the output of the gated optical comparator 125.

The optical signal at the sampling clock input 155 of the gated optical comparator 125 may be digital optical signal, which, in operation, represents one of two states, a digital "high" (or binary one) state in which the optical power exceeds a high threshold (e.g., 8 mW) and a digital "low" (or binary zero) state in which the optical power is less than a low threshold (e.g., 0.5 mW). When the optical sampling clock signal is high, the gated optical comparator 125 may be enabled (or the sampling clock input 155 of the gated optical comparator 125 may be said to be in an enabled state) in the sense that, in this state, the output of the gated optical comparator 125 may be affected by the signal at the analog input of the gated optical comparator 125.

The output of the gated optical comparator 125 may similarly be a digital optical signal, i.e., a signal which, in operation, represents one of two states, e.g., one of the same two states (the digital high state and the digital low state) which the optical signal at the sampling clock input 155 of the gated optical comparator 125 may represent. When the gated optical comparator 125 is in the enabled state, the output may be high when the signal at the analog input of the gated optical comparator 125 is below the comparator threshold of the gated optical comparator 125 (e.g., when the optical power of the signal at the analog input is below 5 mW), and the output may be low when the signal at the analog input of the gated optical comparator 125 is above the comparator threshold.

When the gated optical comparator 125 is disabled (i.e., not enabled), i.e., when the sampling clock input 155 of the gated optical comparator 125 is low, the output of the gated optical comparator 125 may be high.

In such an embodiment, the operation of the gated optical comparator 125 may approximate that of an optical NAND gate, in the sense that the output of the gated optical comparator 125 may be high except when (i) the gated optical comparator 125 is enabled, i.e., the sampling clock input 155 of the gated optical comparator 125 is high, and (ii) the signal at the analog input of the gated optical comparator 125 exceeds the comparator threshold.

Figure 2:
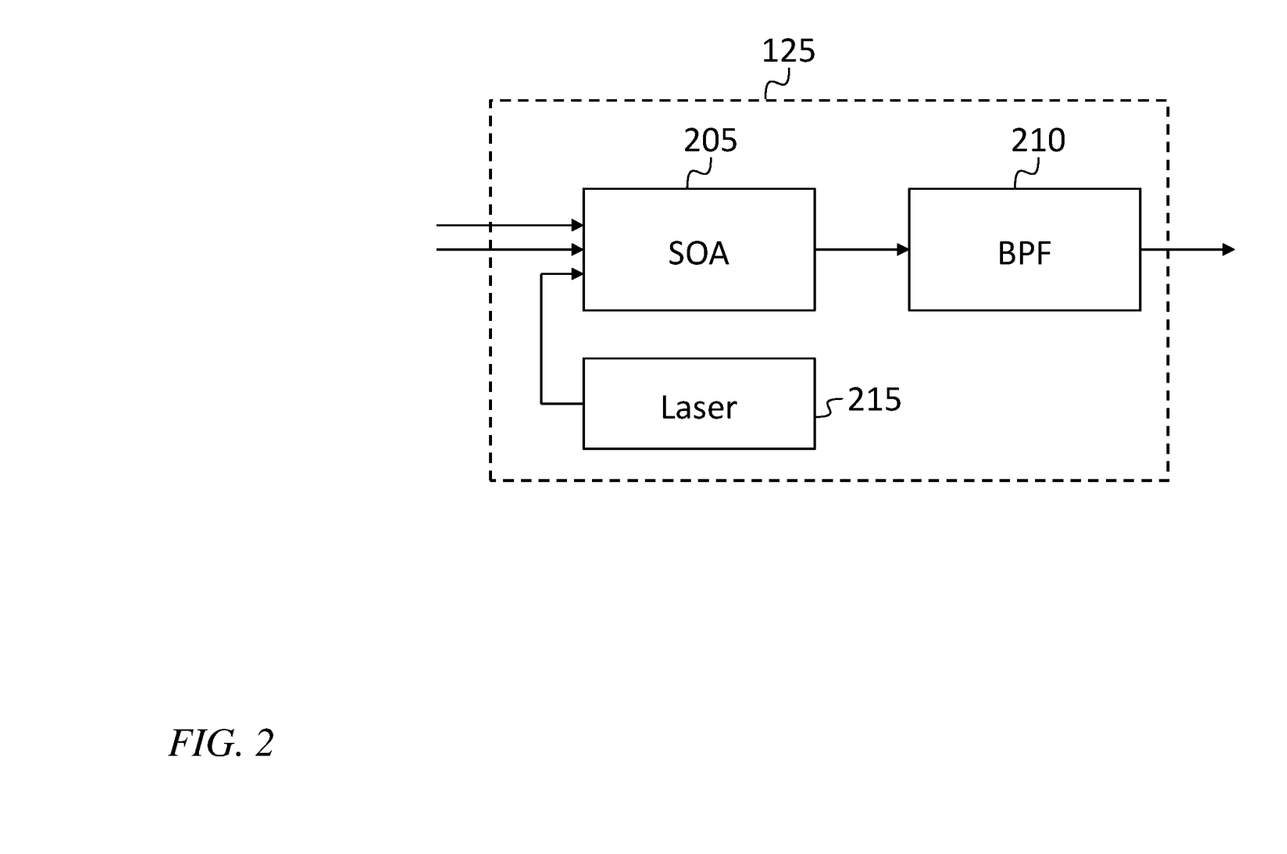
FIG. 2 is a block diagram of a gated optical comparator, according to an embodiment of the present invention.

In some embodiments, referring to FIG. 2, a gated optical comparator 125 in the form of an optical NAND gate may be constructed from a nonlinear optical element (e.g., a semiconductor optical amplifier (SOA)) 205, a band pass filter 210, and a continuous wave light source (e.g., an unmodulated semiconductor laser) 215, having a wavelength within the pass band of the band pass filter 210. Light from the sampling clock input 155 of the gated optical comparator 125, from the analog input of the gated optical comparator 125, and from the continuous wave light source 215 may be fed into the nonlinear optical element 205 (e.g., after being combined into a single mode using a suitable single mode power combiner (not shown)). If the signals received at the two inputs to the gated optical comparator 125 are at different wavelengths and if the wavelength of the continuous wave light source 215 of the gated optical comparator 125 is at a third wavelength, then when either of the inputs of the gated optical comparator 125 (i.e., either one of (i) the sampling clock input 155 of the gated optical comparator 125 and (ii) the analog input of the gated optical comparator 125) are low (i.e., both are receiving no optical power or power that is less than a respective threshold), light from the continuous wave light source 215 of the gated optical comparator 125 may be transmitted through the band pass filter 210 to the output of the gated optical comparator 125, so that the output is high. When both of the inputs of the gated optical comparator 125 are high (i.e., each of these inputs is receiving power above a respective threshold), then four-wave mixing in the nonlinear optical element 205 may attenuate the light from the continuous wave light source 215 (by coupling the optical power into light at a fourth wavelength), so that the output of the gated optical comparator 125 is low. In some embodiments, the gated optical comparator 125 is constructed as an optical NAND gate in accordance with the disclosure of A. Saharia et al., "An approach for Realization of all optical NAND gate using Nonlinear Effect in SOA", published in NNGT Int. J. on Signal Processing and Imaging Engineering, Vol. 1, July 2014.

Figure 3A:
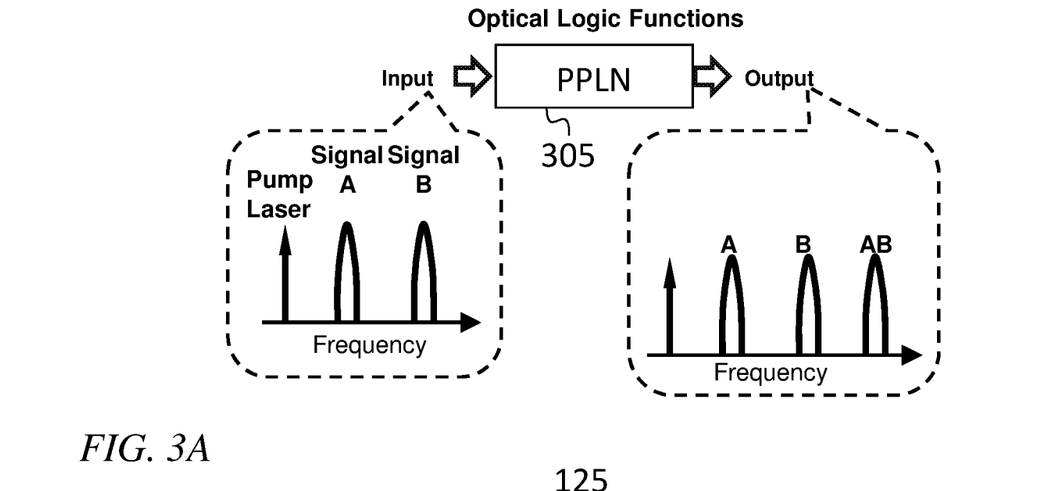
FIG. 3A is a block diagram of a portion of a gated optical comparator, according to an embodiment of the present invention.
Figure 3B:
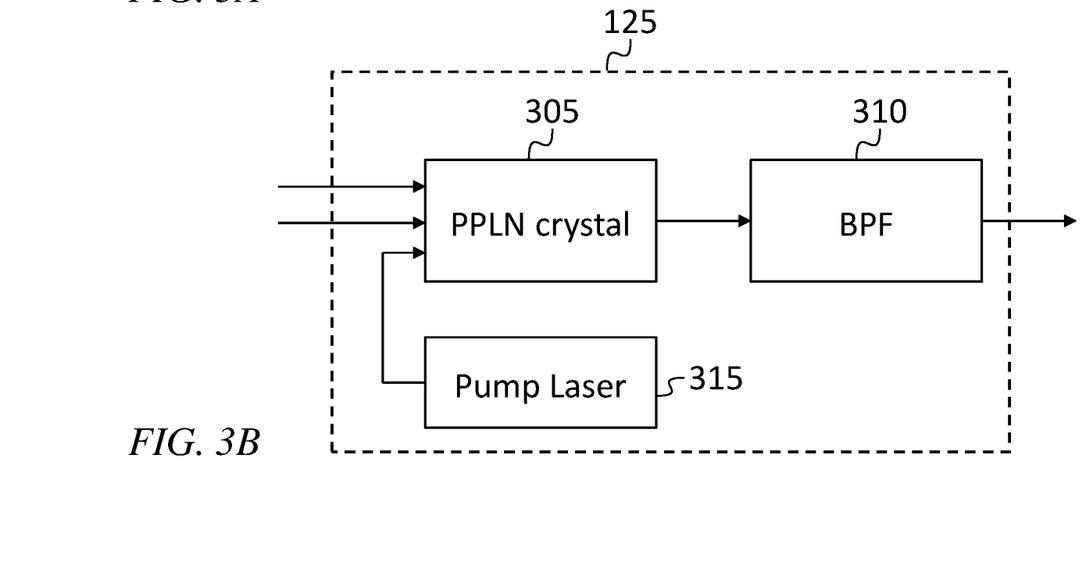
FIG. 3B is a block diagram of a gated optical comparator, according to an embodiment of the present invention.

In some embodiments a periodically poled lithium niobate (PPLN) crystal may be used to construct the gated optical comparator 125, which, in such an embodiment, may operate as an AND gate. Referring to FIGS. 3A and 3B, in some embodiments, a PPLN crystal 305 receives light from each of the two inputs of the gated optical comparator 125, at a first wavelength and a second wavelength, respectively. It also receives light at a third wavelength from a pump laser 315, and generates, at its output, light at a fourth wavelength, which is within the pass band of a band pass filter 310, when light above a respective threshold power level is present at each of the two inputs of the gated optical comparator 125. When light at a power level exceeding the respective threshold power level is not present at one or the other of the inputs of the gated optical comparator 125, then light at the fourth wavelength is not generated, or is generated only weakly, so that the gated optical comparator 125 in this embodiment operates as an optical AND gate. The AND gate may operate as a gated optical comparator 125 in the same manner as a NAND gate, except that its output may be inverted relative to the output that would be produced by a NAND gate. In some embodiments, a PPLN is used to implement a NAND gate, to similar effect, with the NAND gate operating as the gated optical comparator 125.

The sample clock may be square-wave modulated optical signal, generated by any suitable method including direct modulation of a semiconductor laser (e.g., modulation of the drive current of the semiconductor laser) or external modulation (e.g., using a Mach-Zehnder modulator or an electro-absorption modulator). The receiver 140 (FIG. 1) may be synchronized to the transmitter by any of several methods, such as transmitting the sample clock (e.g., a portion of the sample clock signal, split off by a suitable optical power splitter) to the receiver on a separate fiber as a forwarded clock, or such as using a clock and data recovery circuit in the receiver to recover the embedded clock from the signal, after it is converted from an optical signal to an electrical signal (e.g., by a photodetector).

Figure 4:
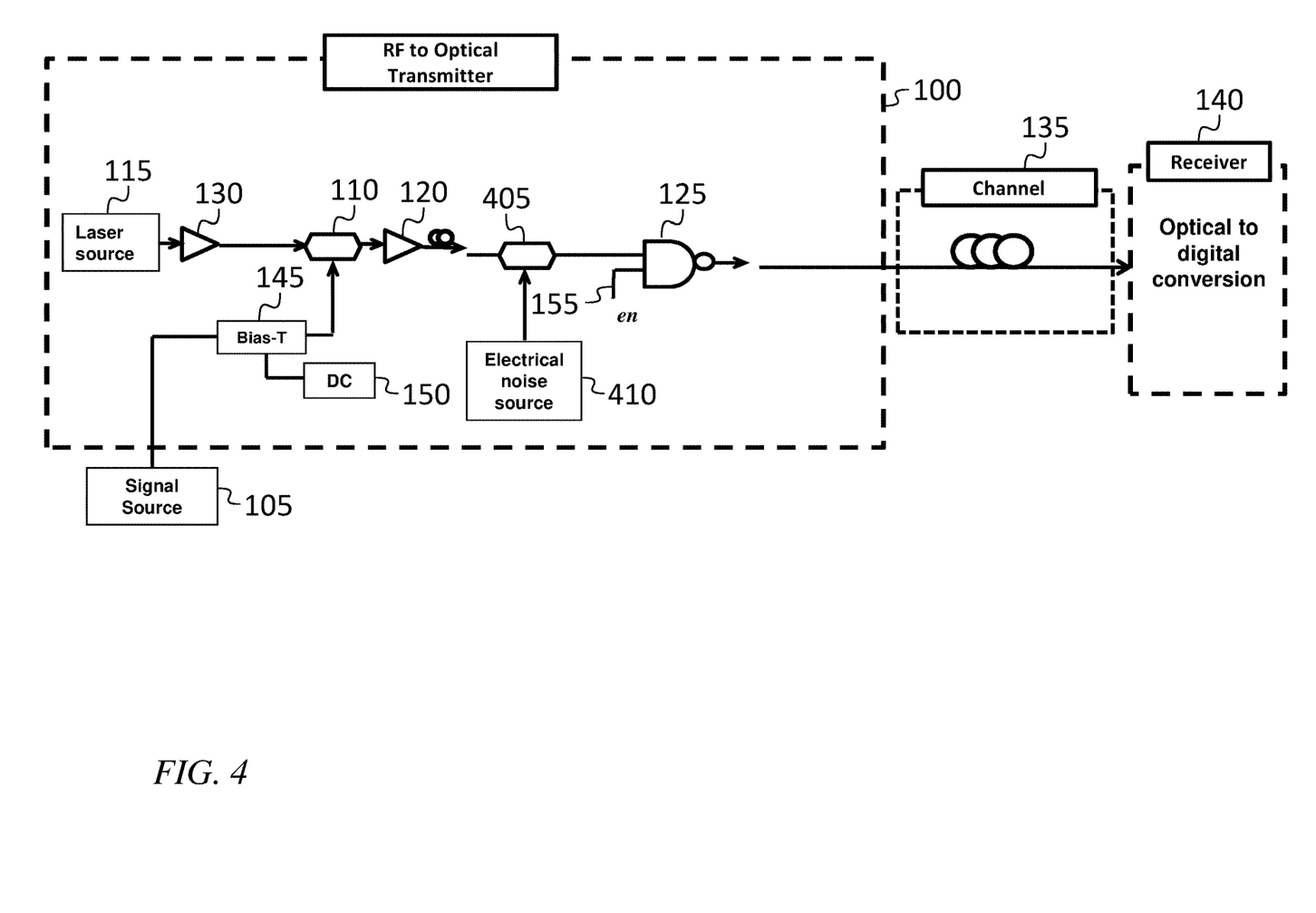
FIG. 4 is a block diagram of a system for signal transmission, according to an embodiment of the present invention.

Referring to FIG. 4, in some embodiments, the RF to optical transmitter 100 further includes an optical noise source, that may include, as shown, an amplitude modulator 405 and an electrical noise source 410 connected to the modulation input of the amplitude modulator 405. The optical noise source may be employed to add amplitude noise (or "dither") to the optical signal prior to the performing of the monobit digitization by the gated optical comparator 125; such noise may improve the linearity and effective resolution of the monobit digitization.

Figure 5:
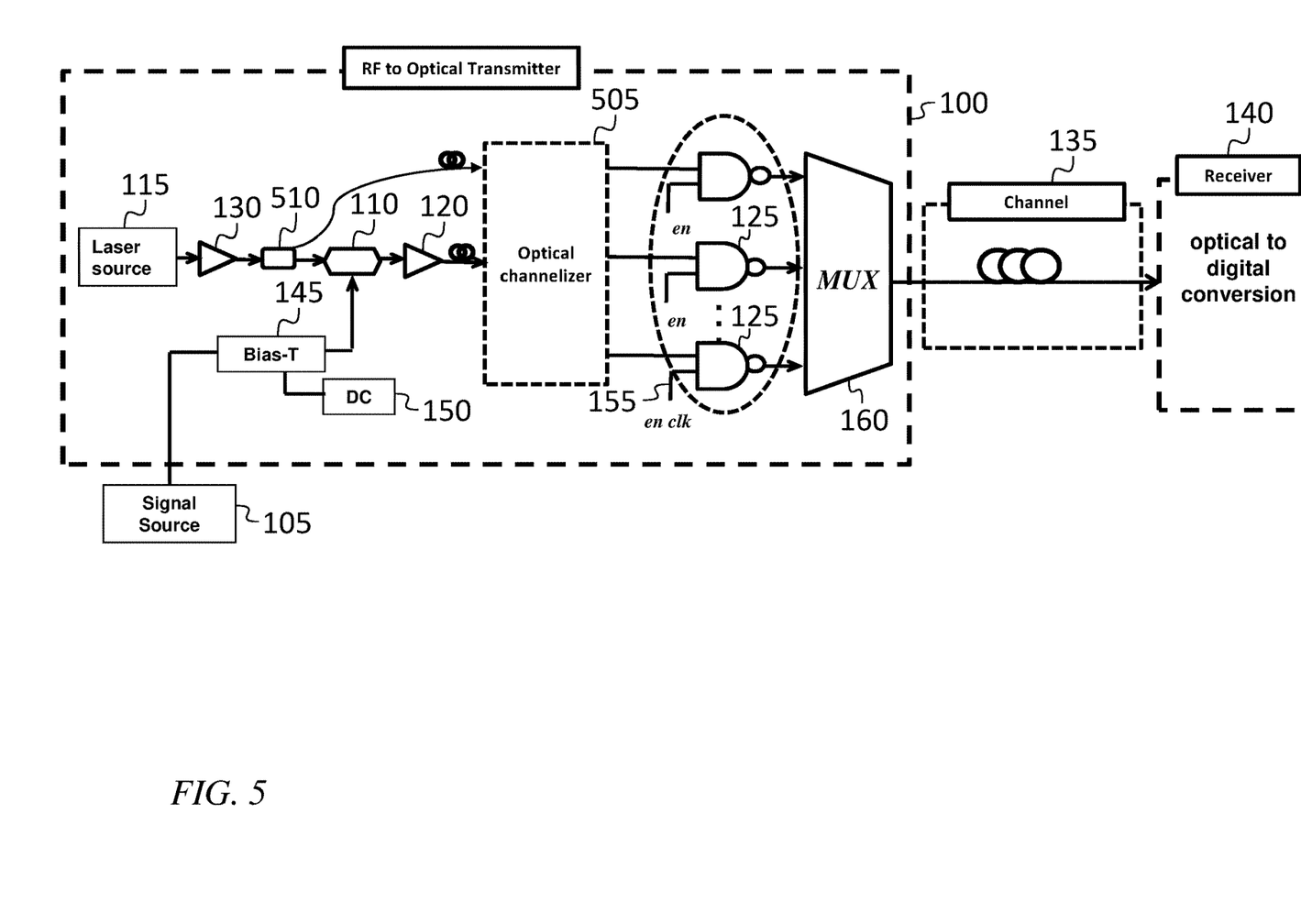
FIG. 5 is a block diagram of a system for signal transmission, according to an embodiment of the present invention.

Referring to FIG. 5, in some embodiments, the optical signal (after analog amplitude modulation is applied by the optical amplitude modulator 110) is separated into a plurality of channels by an optical channelizer 505, each of the channels corresponding to a respective frequency range (or, equivalently, a respective wavelength range) and forming an input to respective gated optical comparators 125. The channels may be at different wavelengths and may be combined onto a single fiber using a suitable multiplexer 160 (such as an N-to-1 optical power combiner, or an arrayed waveguide grating (AWG)). The multiplexer 160 may be any device suitable for combining the channels into a single channel. In the receiver 140, the channels may be separated (e.g., using an AWG) before the signals are converted from optical signals to electrical signals.

Because In the embodiment of FIG. 5, the optical channelizer 505 splits the spectrum of the optical signal into a number of channels, each channelizer output may have a correspondingly smaller bandwidth, and the sampling clock signal fed to the sampling clock input of each of the gated optical comparators 125 may have a correspondingly lower frequency (i.e., the optical digitization rate of each of the gated optical comparators 125 may be lower than in an otherwise similar transmitter 100 constructed according to FIG. 1).

In some embodiments, the optical channelizer 505 is constructed in accordance with the disclosure of W. Wang et al., "Characterization of a Coherent Optical RF Channelizer Based on a Diffraction Grating", published in IEEE Transactions on Microwave Theory and Techniques, Vol. 49, No. 10, October 2001. In such an embodiment, a power splitter 510 may be used to split off a portion of the light produced by the light source 115; this portion may be used to seed (e.g., by injection locking) a mode-locked laser which generates the local oscillator frequency comb in the optical channelizer 505.

Although limited embodiments of a radio frequency to optical transmitter have been specifically described and illustrated herein, many modifications and variations will be apparent to those skilled in the art. Accordingly, it is to be understood that a radio frequency to optical transmitter employed according to principles of this invention may be embodied other than as specifically described herein. The invention is also defined in the following claims, and equivalents thereof.

What is claimed is:

1. A transmitter, having an electrical input and an optical output, the transmitter comprising:
 a light source;
 an optical amplitude modulator configured to receive an optical input from the light source and a modulation input from the electrical input; and
 a first gated optical comparator configured to receive an optical sampling clock signal and an output from the optical amplitude modulator,
 the first gated optical comparator being further configured to generate as the optical output, for each cycle of the optical sampling clock signal, a one-bit digital representation of an analog optical signal received from the optical amplitude modulator.

2. The transmitter of claim 1, wherein the light source is a semiconductor laser.

3. The transmitter of claim 1, wherein the first gated optical comparator is configured to produce:
 an output signal determined by whether an optical power level at an analog input of the first gated optical comparator is above a first threshold, when a sampling clock input is in an enabled state, and
 a fixed output when the sampling clock input is in a disabled state.

4. The transmitter of claim 3, wherein the sampling clock input is in an enabled state when an optical signal received at the sampling clock input has a power level exceeding a second threshold.

5. The transmitter of claim 4, wherein the output signal has an optical power greater than a first power value when the analog input of the first gated optical comparator is above the first threshold, and
 the output signal has an optical power less than a second power value when the analog input of the first gated optical comparator is not above the first threshold,
 the second power value being less than the first power value.

6. The transmitter of claim 4, wherein the output signal has an optical power greater than a first power value when the analog input of the first gated optical comparator is not above the first threshold, and
 the output signal has an optical power less than a second power value when the analog input of the first gated optical comparator is above the first threshold,
 the second power value being less than the first power value.

7. The transmitter of claim 1, wherein the first gated optical comparator is an optical NAND gate.

8. The transmitter of claim 7, wherein the optical NAND gate comprises a continuous wave light source for emitting light at a first wavelength, a semiconductor optical amplifier, and a band pass filter.

9. The transmitter of claim 8, wherein:
 the band pass filter is configured to pass light at the first wavelength; and
 the semiconductor optical amplifier is configured to:
  receive light from:
   the continuous wave light source of the optical NAND gate,
   a sampling clock input of the first gated optical comparator,
   an analog input of the first gated optical comparator, and
  transmit the light from the continuous wave light source when either
   light from the sampling clock input of the first gated optical comparator, or
   light from the analog input of the first gated optical comparator
  is not present, and
  attenuate, as a result of four-wave mixing in the semiconductor optical amplifier, the light from the continuous wave light source when both
   light from the sampling clock input of the first gated optical comparator, and
   light from the analog input of the first gated optical comparator
  are present.

10. The transmitter of claim 7, wherein the optical NAND gate comprises a nonlinear optical crystal and a band pass filter.

11. The transmitter of claim 10, wherein the nonlinear optical crystal is a periodically poled lithium niobate crystal.

12. The transmitter of claim 1, further comprising a first optical amplifier, wherein an analog input of the first gated optical comparator is connected to the output of the optical amplitude modulator through the first optical amplifier.

13. The transmitter of claim 12, wherein the light source is a laser with an operating wavelength between 1540 nm and 1560 nm, and the first optical amplifier is an erbium doped fiber amplifier.

14. The transmitter of claim 13, further comprising a second optical amplifier, wherein the optical input of the optical amplitude modulator is connected to the light source through the second optical amplifier.

15. The transmitter of claim 1, further comprising an optical noise source, wherein an analog input of the first gated optical comparator is connected to the output of the optical amplitude modulator through the optical noise source.

16. The transmitter of claim 15, wherein the optical noise source comprises an electrical noise source and a second optical amplitude modulator, a modulation input of the second optical amplitude modulator being connected to an output of the electrical noise source.

17. The transmitter of claim 1, wherein the optical amplitude modulator is a Mach-Zehnder modulator.

18. The transmitter of claim 1, wherein the optical amplitude modulator is an electro-absorption modulator.

19. The transmitter of claim 1, further comprising:
   an optical power splitter, connected between the light source and the optical amplitude modulator;
   an optical channelizer, having:
      a signal input,
      a local oscillator input, and
      a plurality of outputs including a first output and a second output; and
   a second gated optical comparator, having:
      a sampling clock input, and
      an analog input,
   the first output of the optical channelizer being connected to the analog input of the first gated optical comparator, and
   the second output of the optical channelizer being connected to the analog input of the second gated optical comparator.

20. The transmitter of claim 19, further comprising an optical multiplexer having:
   a first input,
   a second input, and
   an output,
   the first input being connected to the output of the first gated optical comparator, and
   the second input being connected to the output of the second gated optical comparator.

* * * * *